US012627737B2

(12) United States Patent
Huang et al.

(10) Patent No.: US 12,627,737 B2
(45) Date of Patent: May 12, 2026

(54) COMMUNICATION CONTROL METHOD, GATEWAY AND VEHICLE EMPLOYING METHOD

(71) Applicants: Futaijing Precision Electronics (Yantai) Co., Ltd., Yantai (CN); HON HAI PRECISION INDUSTRY CO., LTD., New Taipei (TW)

(72) Inventors: Guan-Lin Huang, New Taipei (TW); Chia-Wei Hsiung, New Taipei (TW); Wi-Lien Sung, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 117 days.

(21) Appl. No.: 18/611,921

(22) Filed: Mar. 21, 2024

(65) Prior Publication Data

US 2025/0211643 A1 Jun. 26, 2025

(30) Foreign Application Priority Data

Dec. 26, 2023 (CN) .......................... 202311810139.8

(51) Int. Cl.
| | |
|---|---|
| *H04L 67/12* | (2022.01) |
| *B60R 16/023* | (2006.01) |
| *H04L 12/66* | (2006.01) |
| *H04W 4/48* | (2018.01) |

(52) U.S. Cl.
CPC ............ *H04L 67/12* (2013.01); *B60R 16/023* (2013.01); *H04L 12/66* (2013.01); *H04W 4/48* (2018.02)

(58) Field of Classification Search
CPC ....... H04L 67/12; H04L 67/125; H04L 12/66; B60R 16/023; H04W 4/48
USPC .......................................................... 701/36
See application file for complete search history.

(56) References Cited

U.S. PATENT DOCUMENTS

| | | | | |
|---|---|---|---|---|
| 11,590,907 | B2 * | 2/2023 | Sugawa ............ | H04L 12/40039 |
| 11,838,884 | B1 * | 12/2023 | Dergosits .............. | G06F 1/3234 |
| 11,917,040 | B1 * | 2/2024 | Mendez Rodriguez ..................... H04L 67/12 |
| 12,189,450 | B2 * | 1/2025 | Kobayashi ............ | B60W 10/08 |
| 2021/0176092 | A1 * | 6/2021 | Frischmuth ............. | H04L 12/66 |
| 2021/0234761 | A1 * | 7/2021 | Fang ..................... | H04L 41/082 |
| 2023/0156087 | A1 * | 5/2023 | McCann .............. | H04W 12/04 370/338 |

* cited by examiner

*Primary Examiner* — Krishnan Ramesh
(74) *Attorney, Agent, or Firm* — ScienBiziP, P.C.

(57) ABSTRACT

A communication control method applied to a gateway of a vehicle includes: obtaining driving information and driving environment information of the vehicle; determining a communication parameter according to the driving information and the driving environment information of the vehicle; and sending the communication parameter to a plurality of vehicle on board controllers (VOBCs) of the vehicle. The communication parameter is selected form a group of a communication frequency, a communication rate, and a communication protocol, the plurality of VOBCs communicate with each other according to the communication parameter. A gateway and a vehicle are also disclosed.

13 Claims, 4 Drawing Sheets

10

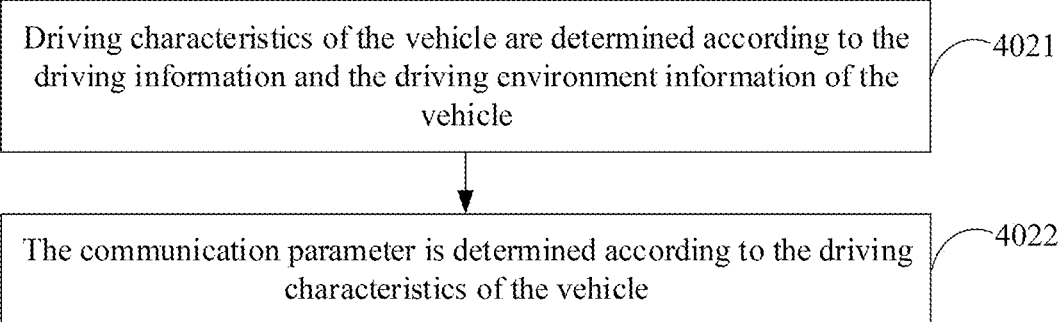

Driving characteristics of the vehicle are determined according to the driving information and the driving environment information of the vehicle — 4021

The communication parameter is determined according to the driving characteristics of the vehicle — 4022

FIG. 5

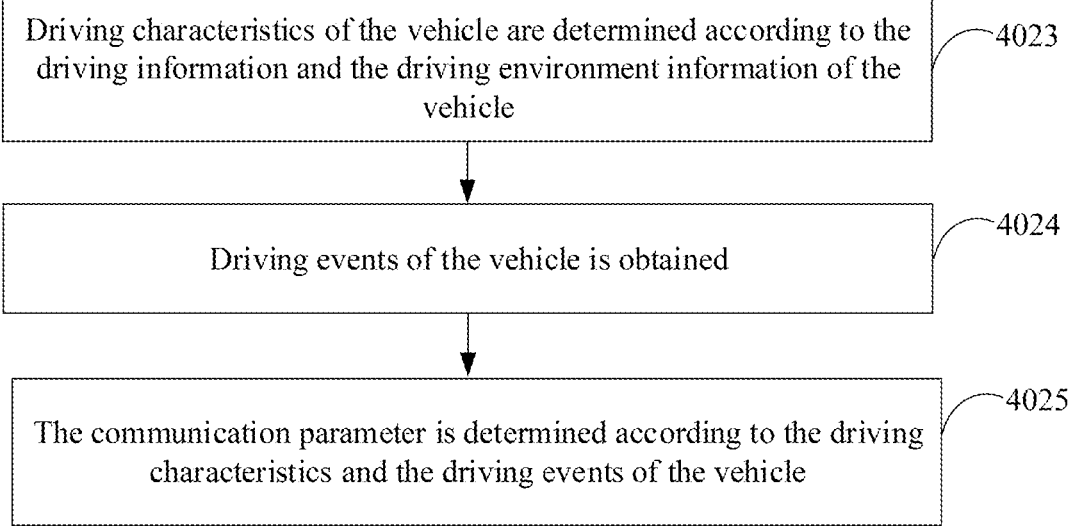

Driving characteristics of the vehicle are determined according to the driving information and the driving environment information of the vehicle — 4023

Driving events of the vehicle is obtained — 4024

The communication parameter is determined according to the driving characteristics and the driving events of the vehicle — 4025

FIG. 6

COMMUNICATION CONTROL METHOD, GATEWAY AND VEHICLE EMPLOYING METHOD

TECHNICAL FIELD

The subject matter herein generally relates to vehicle controller communications.

BACKGROUND

A high degree of intelligence of a new energy vehicle (electric vehicle) make functions and a complexity of a driving system of the new energy vehicle also high. Communication parameters of the driving system of the new energy vehicle cannot be dynamically adjusted according to the driving state and the external environment, resulting in a waste of communication resources and an unnecessary consumption of energy consumption. The unnecessary energy consumption not only affect a driving range of the new energy vehicle, but also reduce an energy efficiency of the new energy vehicle.

BRIEF DESCRIPTION OF THE DRAWINGS

Implementations of the present disclosure will now be described, by way of embodiments, with reference to the attached figures.

FIG. 5 is a sub flowchart illustrating a part of the communication control method according to an embodiment of the present disclosure.

FIG. 6 is a sub flowchart illustrating a part of the communication control method according to another embodiment of the present disclosure.

DETAILED DESCRIPTION

Figure 1:
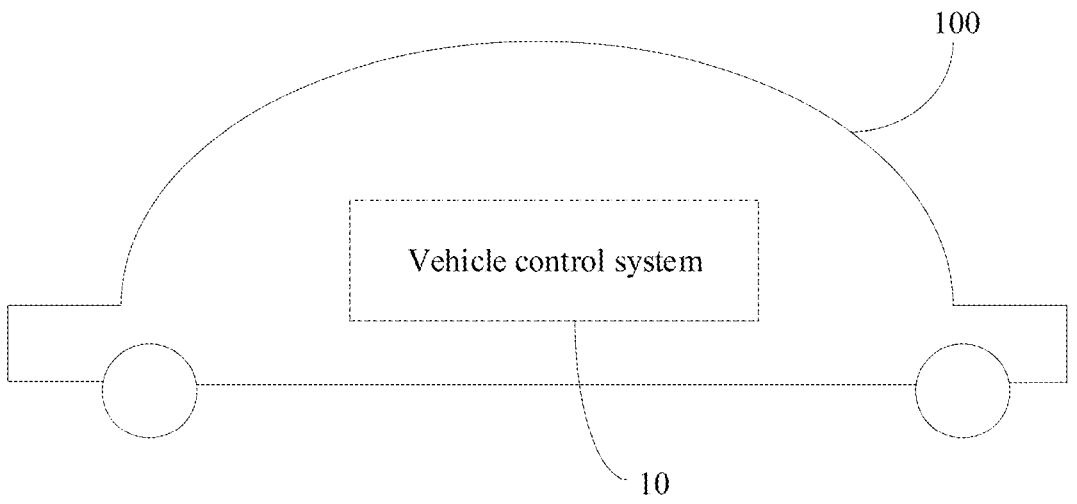
FIG. 1 is a block diagram illustrating an vehicle according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
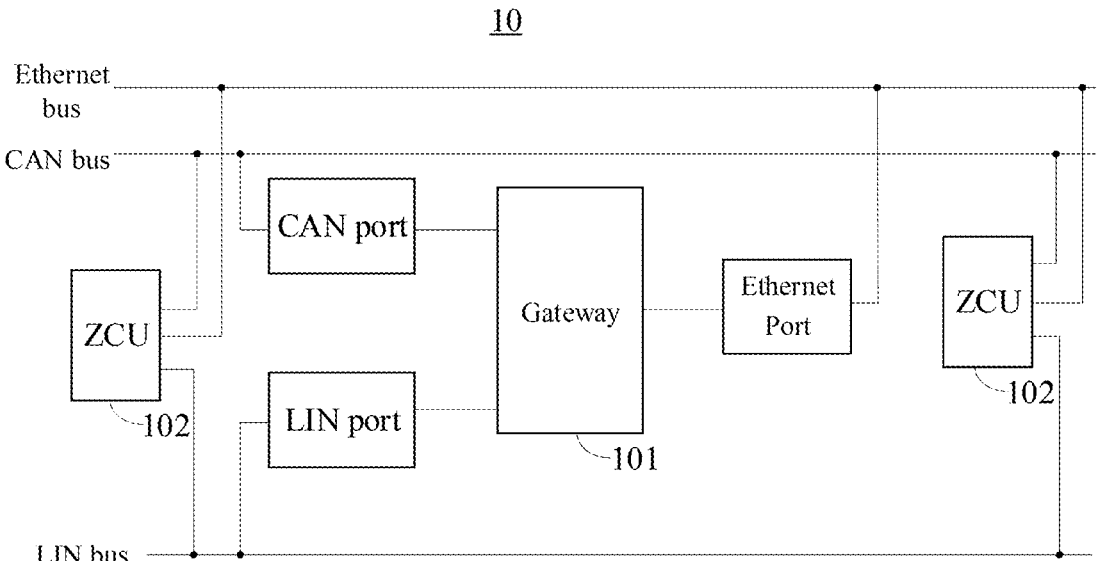
FIG. 2 is a block diagram illustrating a vehicle control system of the vehicle according to an embodiment of the present disclosure.

Referring to FIG. 1 and FIG. 2, a vehicle 100 may include a vehicle control system 10. The vehicle control system 10 may include a gateway 101 and a plurality of zone control units (ZCUs) 102. Each ZCU 102 may be configured to perform data/environmental perception, data processing, function control, and command execution of a local region of the vehicle 100. For example, each ZCU 102 can be configured to couple sensors, actuators, and electronic control units (ECUs) in an area of the vehicle 100, and each ZCU 102 can be configured for a preliminary calculation and processing of sensor data, and network protocol conversion in the area of the vehicle 100.

For example, the ZCUs 102 can be divided into a front domain ZCU (located in the front part of the vehicle), a middle domain ZCU (located in the middle of the vehicle), and a rear domain ZCU (located in the rear of the vehicle) according to positions of the ZCUs 102 in the vehicle 100. The ZCUs 102 can also be divided into a power domain ZCU, a body domain ZCU, a chassis domain ZCU, a cockpit domain ZCU and an autonomous driving domain ZCU according to functions of the ZCUs 102 in the vehicle 100.

The gateway 101 can be configured to perform a protocol conversion between different bus types, a data interaction between different networks/controllers inside the vehicle 100, a communication management between an internal network of the vehicle 100 and an external network (for example, Internet or a network of another vehicle), etc. For example, the gateway 101 can communicate with the ZCU 102 and the ECU of the vehicle 100.

In one embodiment, the vehicle control system 10 may further include vehicle-level controllers, such as a vehicle control unit (VCU), the VCU is configured for managing and coordinating communication and operation between multiple systems and subsystems of the vehicle 100.

In one embodiment, if a ECU of the vehicle control system 10 does not correspond to a upper ZCU, the gateway 101 can communicate directly with the ECU. If a ECU of the vehicle control system 10 corresponds to a upper ZCU, and the gateway 101 can communicate with the ECU through the ZCU.

In one embodiment, communication buses of vehicle control system 10 may include local interconnect network (LIN) buses, controller area network (CAN) buses, Ethernet buses, etc.

In one embodiment, the gateway 101 can support a plurality of wireless communication protocols and wired communication protocols running on the vehicle 100. The gateway 101 can further optimize an energy consumption by selecting the communication parameter between each node in a vehicle topology communication network, to avoid an unnecessary consumption of communication energy, and improving the driving range and the energy efficiency of the vehicle. The vehicle topology communication network may be a network topology composed of nodes, such as ZCU, ECU, VCU, etc.

In one embodiment, the communication parameter may be selected from a group of communication frequency, communication rate, and communication protocol. The communication parameter can also include other parameters, the other parameters can be defined according to an actual energy conservation requirement.

Figure 3:
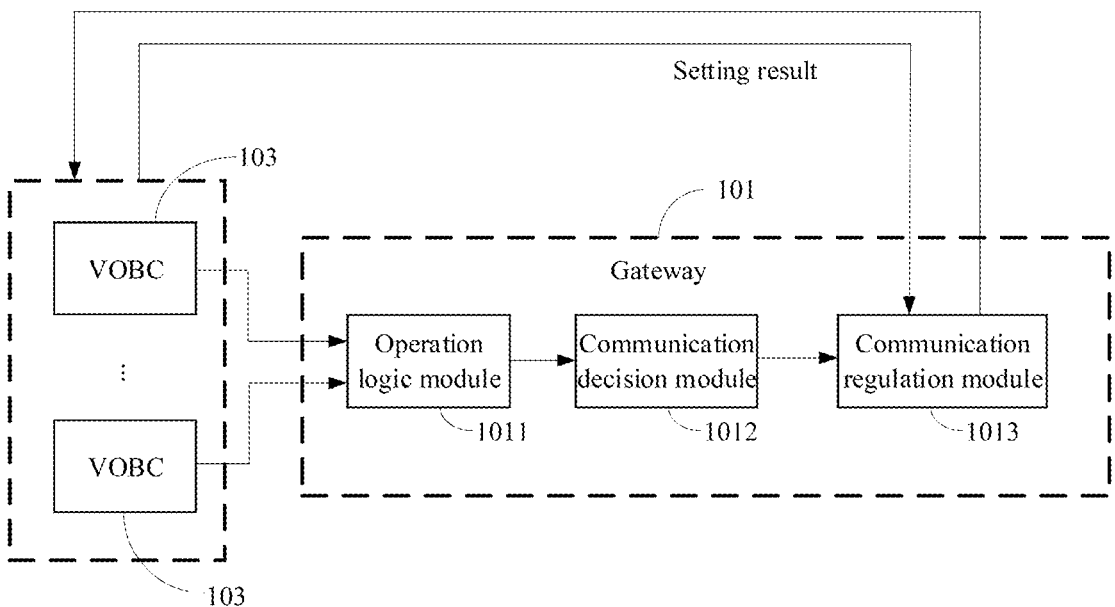
FIG. 3 is a block diagram illustrating a gateway of the vehicle according to an embodiment of the present disclosure.

Referring to FIG. 3, the gateway 101 may include an operation logic module 1011, a communication decision module 1012, and a communication regulation module 1013. The operation logic module 1011, the communication decision module 1012, and the communication regulation module 1013 are operated in series to achieve an energy-saving function. The three modules (the operation logic module 1011, the communication decision module 1012, and the communication regulation module 1013) can be decoupled from each other, so different operation logic strategies, communication decisions strategies, communication regulation strategies can be replaced in different vehicles.

In one embodiment, the operation logic module 1011 can be configured for receiving driving information and driving environment information sent by one or more vehicle on board controllers (VOBCs) 103, performing a logical judgment based on the driving information and the driving environment information, and sending the logic judgment result and the received data to the communication decision module 1012 for calculation/process. The logical judgment may refer to a judgment and a classification of a driving risk of the vehicle 100. The driving risk may be derived from vehicle internal factors (e.g., vehicle condition) or vehicle external factors (e.g., road conditions, weather, other vehicles, pedestrians, or non-motor vehicles). The plurality of VOBCs 103 may be controllers included in a control system/subsystem of the vehicle 100. For example, the control subsystem is a forward collision warning (FCW) system, the FCW system refers to a plurality of VOBCs 103, and the plurality of VOBCs 103 may include a FCW controller, an anti-lock braking system (ABS) controller, a body control module (BCM) controller, and an dashboard controller.

In one embodiment, the operation logic module 1011 can obtain driving information and driving environment information from a plurality of VOBCs 103 based on a signal-oriented way or a service-oriented architecture (SOA)-oriented way. For example, the FCW systems use sensors and radars to monitor vehicles ahead, to alert a driver of the vehicle 100 a dangerous situation may be imminent. When the FCW system detects a possible risk of collision, the FCW system may provide collision warning information in a variety of ways, including sound warning, such as the car speaker outputs the sound warning to remind the driver to slow down or take action to avoid collision, warning pattern, such as the dashboard or the windshield (windshield head-up display technology) outputs the warning pattern to remind the driver to slow down or take action to avoid collision, and vibration warning, such as the seat or the steering wheel is vibrated to remind the driver to slow down or take action to avoid collision.

Taking the signal-oriented way as an example, in order to realize pre-warning, the FCW controller is configured to obtain vehicle distance information through sensors, the FCW controller further obtains vehicle speed information from the ABS controller, the FCW controller can generate pre-warning control signals based on the vehicle distance information and the vehicle speed information, and send the pre-warning control signals to the BCM controller and the dashboard controller. The BCM controller can control the vehicle speaker to output the sound warning, the seat and the steering wheel to vibrate. The dashboard controller can control the dashboard to output the warning pattern. Then, in the FCW system, the VOBCs can be determined to include the FCW controller, the ABS controller, the BCM controller, and the dashboard controller.

In one embodiment, the VOBCs 103 can be ECUs, ZCUs, or other controllers deployed on the vehicle 100. The embodiments do not limit types of the VOBCs 103. The driving information may be selected from a group of vehicle speed, vehicle acceleration, steering wheel rotation angle, motor speed, remaining power/state of charge (SOC), etc. The driving information may further include driving events. The driving events may include, but not limited to, vehicle pedal events and vehicle gear events. The driving environment information may be selected from a group of weather information, road condition information, status of other traffic participants (e.g., other vehicles, pedestrians, non-motor vehicles, etc.) around the vehicle, and distance information of the other traffic participants with respect to the vehicle.

The communication decision module 1012 can be used to receive the data sent by the operation logic module 1011 and calculate an appropriate communication parameter based on the received data. The appropriate communication parameter meets a communication requirement of the logic judgment result and further minimizes the energy consumption, so as to minimize the communication energy consumption under a condition of ensuring the safety of the vehicle. Taking the FCW system as an example, the communication decision module 1012 can receive a degree of vehicle distance, the driving behavior of the vehicle in front, the weather information, and the road condition information from the operation logic module 1011, to decide an objective communication frequency and an objective communication protocol (meets the communication requirement of the degree of vehicle distance, and the energy consumption is minimized). The objective communication frequency and the objective communication protocol can be transmitted to the communication regulation module 1013, and the communication regulation module 1013 can transmit the objective communication frequency and the objective communication protocol communicates to the FCW controller, the ABS controller, the BCM controller, and the dashboard controller. Then, the FCW controller, the ABS controller, the BCM controller, and the dashboard controller can communicate with each other based on the objective communication frequency and the objective communication protocol.

The communication regulation module 1013 is configured to transmit the communication parameter to the plurality of VOBCs 103, the plurality of VOBCs 103 can communicate with each other based on the communication parameter. For example, the communication regulation module 1013 can send a setting instruction of the communication parameter to each of the plurality of VOBCs 103, to set the communication parameter of each of the plurality of VOBCs 103, and then the plurality of VOBCs 103 can communicate with each other based on the communication parameter.

In one embodiment, the communication regulation module 1013 can also send the setting instruction of the communication parameter to the plurality of VOBCs 103 based on the signal-oriented way or the SOA-oriented way, to set the communication parameter of each of the plurality of VOBCs 103. Taking the FCW system as an example, the communication regulation module 1013 can send the setting instruction of the communication parameter to the FCW controller, the ABS controller, the BCM controller, and the dashboard controller based on the signal-oriented way, so that the FCW controller, the ABS controller, the BCM controller, and the dashboard controller can communicated with each other based on the communication parameter.

In one embodiment, the communication regulation module 1013 can also receive the setting results of the communication parameter returned by the plurality of VOBCs 103, and set the setting results of the communication parameter as comparison reference parameters of the plurality of VOBCs in a next parameter setting process. For example, in a next parameter setting process, if the current communication parameter meets the communication requirement, and the energy consumption difference between the current communication parameter and a new communication parameter calculated by the communication decision module 1012 is within a preset range, the setting of the new communication parameter of the plurality of VOBCs 103 is abandoned. That is, even through the new communication parameter is calculated, the plurality of VOBCs 103 still use the current communication parameter to communicate with each other, to avoid a frequent update of the communication parameter of the plurality of VOBCs 103, and the power consumption caused by updating the communication parameter can be reduced. The preset range can be set according to an actual requirement.

In one embodiment, an exception signal or an exception VOBC can be set according to an actual requirement, the exception signal or the exception VOBC is not controlled by the communication regulation module 1013. The exception signal can be transmitted according to a preset communication parameter, or a communication with the exception VOBC can use a preset communication parameter, or the exception VOBC does not respond the setting instruction of the communication parameter sent by the communication regulation module 1013.

In one embodiment, the module (the operation logic module 1011, the communication decision module 1012, or the communication regulation module 1013) may include one or more software programs in the form of computerized codes stored in a data storage. The computerized codes can include instructions that can be executed by a processor to implement the above-mentioned function of the module.

Figure 4:
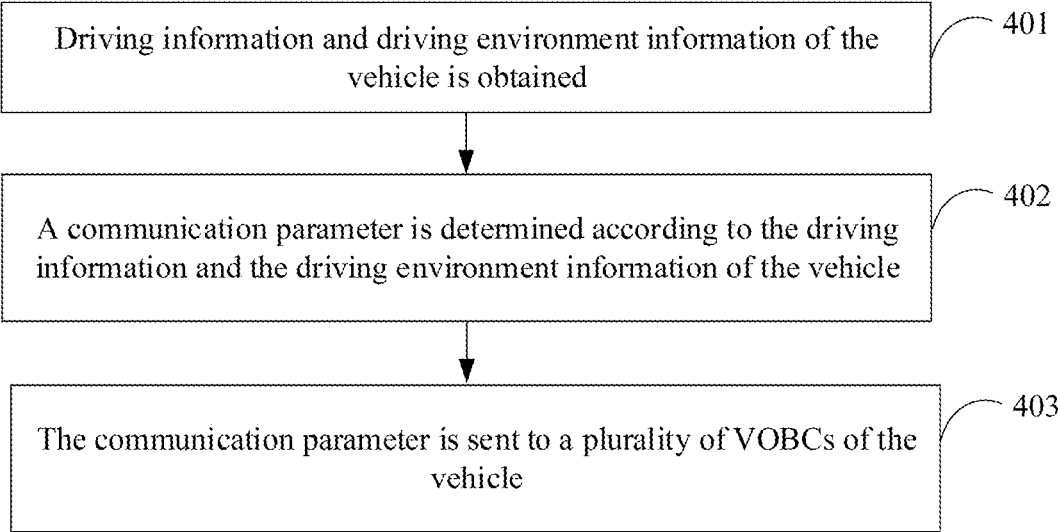
FIG. 4 is a flowchart illustrating a communication control method applied to the gateway according to an embodiment of the present disclosure.

FIG. 4 illustrates one exemplary embodiment of a communication control method. The communication control method can be applied to a gateway of a vehicle. The flowchart presents an exemplary embodiment of the method. The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 401.

In block 401, driving information and driving environment information of the vehicle is obtained.

In one embodiment, the vehicle can preset one or more control subsystems to support a setting of dynamic communication parameter, and the gateway can dynamically set the communication parameter of VOBCs in the one or more control subsystems.

If a control subsystem supports setting of dynamic communication parameter, the gateway can determine objective VOBCs of the control subsystem based on a signal-oriented way or a SOA-oriented way. After the driving information and the driving environment information of the vehicle are obtained, the gateway can set the communication parameter of the objective VOBCs according to the driving information and the driving environment information. Taking the setting of dynamic communication parameter in a first control subsystem as an example, the first control subsystem may be a subsystem of a control function or a pre-warning function of the vehicle, and the embodiments does not limit the function of the first control subsystem.

In one embodiment, the gateway can received the driving information and the driving environment information sent by the VOBCs of the first control subsystem, or actively obtain the driving information and the driving environment information form the VOBCs of the first control subsystem.

In block 402, a communication parameter is determined according to the driving information and the driving environment information of the vehicle.

In one embodiment, the communication parameter may be selected form a group of a communication frequency, a communication rate, and a communication protocol.

In one embodiment, the driving information may include vehicle condition information and remaining power information, etc. The driving environment information may include vehicle distance information, road condition information, weather information, etc. The vehicle condition information can be defined as vehicle internal factor, the driving environment information can be defined as vehicle external factors, and the remaining power information can be defined as remaining energy factor. Communication parameters can be determined based on a combination of the three factors, each factor can have a different priority/weight. The vehicle internal factor is directly related to the driving function of the vehicle, in order to ensure a driving safety of the vehicle, the priority/weight of the vehicle internal factor can be set to the highest. The vehicle external factor may affect the driving safety more than the remaining energy factor, so the priority/weight of the vehicle external factor can be set to be greater than the priority/weight of the remaining energy factor. The remaining energy factor is less likely to affect the driving safety of the vehicle than the vehicle internal factor and the vehicle external factor, so the priority/weight of the remaining energy factor is set to the lowest. That is, a priority/weight setting rule can be: vehicle internal factor>vehicle external factor>remaining energy factor.

For example, the driving information includes the vehicle condition information and the remaining power information, and the driving environment information includes the vehicle distance information, the road condition information, and the weather information. The five factors (the vehicle condition information, the remaining power information, the vehicle distance information, the road condition information, and the weather information) can be configured to determine the communication parameter, each factor can have different priority/weight. A difference among the priorities/weights of the weather information, the vehicle distance information, and the road condition information is small, and the priorities/weights of the three factors can be defined as: weather information>vehicle distance information>road condition information.

The bad road condition is easier for the driver to notice in advance, the vehicle distance is easier for the driver to notice in advance than a sudden change in the weather, and the priority/weight of the vehicle distance is slightly higher than the road condition. The weather information is changeableness, and the priority/weight of the weather is slightly higher than the vehicle distance. In order to ensure the driving safety, the priorities/weights of the third factors can be set as: vehicle condition information>weather information>vehicle distance information>road condition information>remaining power information. That is, the priority/weight of the vehicle condition information is the highest, and the priority/weight of the remaining power information is the lowest.

In one embodiment, the driving information includes two information features: vehicle condition information and remaining power information, and the driving environment information includes three information features: vehicle distance information, road condition information, and weather information, and each information feature is provided with a parameter response weight, and the parameter response weights can be defined as: vehicle condition information>weather information>vehicle distance information>road condition information>remaining power information. The gateway can determine the communication parameter according to eigenvalues and parameter response weights of the vehicle condition information, the weather information, the vehicle distance information, the road condition information, and the remaining power information. So the vehicle condition information, the remaining power information, the vehicle distance information, the road condition information, and the weather information can be combined to consider to determine the communication parameter.

For example, Table 1 shows a relationship between a flow rate of the communication parameter and a state of each information feature.

TABLE 1

| information feature | flow rate low → high |
| --- | --- |
| vehicle condition | good condition → bad condition |
| weather | good sight → poor sight |
| vehicle distance | far → close |
| road condition | good handing → poor handing |
| remaining power | low → high |

In one embodiment, for the vehicle condition information, if an eigenvalue of the vehicle condition is abnormal, indicating that a failure probability of vehicle handling/function is high, a high frequency transmission cycle (corresponding to a high flow) can be used to ensure a immediacy of vehicle handling, the high frequency transmission cycle is a conducive for collecting/monitoring the vehicle condition, and warning information can timely remind the driver. If the eigenvalue of the vehicle condition is normal, indicating that failure probability of vehicle handling/function is low, a low frequency transmission cycle (corresponding to a low flow) is required to save power consumption.

For the weather information, if the sight is poor, a high frequency transmission cycle is required to ensure that a driver assistance system can respond quickly, and the high frequency transmission cycle is a conducive for collecting/monitoring the surrounding environment of the vehicle to send warning messages to the driver in time. If the sight is good, a low frequency transmission cycle can be used to save power consumption.

For the vehicle distance information, if the vehicle distance is close, a high frequency transmission cycle is required to ensure that the driver assistance system can respond quickly, and the high frequency transmission cycle is a conducive for collecting/monitoring the surrounding environment of the vehicle to send warning information to the driver in time. If the vehicle distance is far, a low frequency transmission cycle can be used to save power consumption.

For the road condition information, if the road condition is poor, the vehicle handling may be also poor, and a high frequency transmission cycle is required to ensure that the driver assistance system can respond quickly, and the high frequency transmission cycle is a conducive for collecting/monitoring the surrounding environment of the vehicle to send warning information to the driver in time. If the road condition is good, a low frequency transmission cycle can be used to save power consumption.

For the remaining power information, a high frequency transmission cycle means that the power consumption is higher. If the remaining power of the vehicle is low, a low frequency transmission cycle can be used to save power consumption, and the driving range of the vehicle can be increased. If the remaining power of the vehicle is high, a high frequency transmission cycle can be used, to improve a response sensitivity of the control subsystem.

In one embodiment, the high frequency transmission cycle can correspond to a high communication frequency, a high communication rate, or a communication protocol with a high communication rate.

In one embodiment, the communication parameter may include the communication frequency, the communication rate, and the communication protocol. For example, the gateway can select an objective communication protocol and an objective communication frequency with the lowest energy consumption based on the driving information and the driving environment information, and the gateway can further determine an objective communication rate to meet a communication requirement of the current driving scenario.

In one embodiment, after determining the communication protocol and the communication frequency, the gateway can monitor the current communication rate of the plurality of VOBCs, and adjust the current communication rate of the plurality VOBCs based on a prediction communication rate (the predicted communication rate is predicted based on the driving information and the driving environment information).

In one embodiment, as shown in FIG. 5, the gateway determining the communication parameter according to the driving information and the driving environment information may further include block 4021 and block 4022.

In block 4021, driving characteristics of the vehicle are determined according to the driving information and the driving environment information of the vehicle.

In one embodiment, the driving characteristics of the vehicle may refer to characteristics configured to judge and classify a driving risk of the vehicle. The driving risk can derive from vehicle internal factors (e.g., vehicle condition, remaining power), or vehicle external factors (e.g., vehicle distance, weather, road condition). For example, the driving characteristics of the vehicle can include vehicle condition level (good vehicle condition, average vehicle condition, bad vehicle condition, etc.), vehicle distance level (far distance, moderate distance, close distance, etc.), road condition level (good road condition, average road condition, poor road condition, etc.), remaining power level (sufficient power, average power, low power, etc.), weather condition level (good weather, average weather, poor weather, etc.). Each level of the factor can be defined according to an actual requirement, and the embodiments do not limit this. For example, the sufficient power may indicate that the remaining power is greater than 70% (SOC>70%), the low power may indicate that the remaining power is less than 30% (SOC<30%), and the average power may indicate that the remaining power is within a range of 30%~70%.

In block 4022, the communication parameter is determined according to the driving characteristics of the vehicle.

After the driving characteristics of the vehicle are determined, the gateway can further determine the communication parameter corresponding to the driving characteristics, to minimize energy consumption under a precondition of meeting the communication requirement of the driving characteristics.

In one embodiment, the communication parameter corresponding to the driving characteristics may be a parameter that meet the communication requirement of the driving characteristics and the communication energy consumption conforms to a preset energy consumption rule. The preset energy consumption rule can be energy consumption minimized.

In one embodiment, if another vehicle is in front of the vehicle in a preset distance, after determining the driving characteristics, the gateway can also determine the communication parameter based on the driving characteristics and a driving behavior (speed change behavior, lane change behavior) of the another vehicle, to guarantee the driving safety of the vehicle.

In one embodiment, as shown in FIG. 6, the gateway determining the communication parameter according to the driving information and the driving environment information may further include block 4023, block 4024, and block 4025.

In block 4023, driving characteristics of the vehicle are determined according to the driving information and the driving environment information of the vehicle.

In block 4024, driving events of the vehicle is obtained.

In block 4025, the communication parameter is determined according to the driving characteristics and the driving events of the vehicle.

In one embodiment, the driving events may include pedal events (electronic accelerator pedal, brake pedal) and steering wheel adjustment events. A driving behavior can also affect the driving safety of the vehicle, after determining the driving characteristics, the gateway may determine the communication parameter based on the driving characteristics and driving events, realizing a minimization of energy consumption under a precondition of ensuring driving safety.

In block 403, the communication parameter is sent to a plurality of VOBCs of the vehicle.

In one embodiment, the plurality of VOBCs can belong to a control subsystem, and the control subsystem supports a setting of dynamic communication parameter.

After determining the communication parameter, the gateway can send the communication parameter to the plurality of VOBCs, and the plurality of VOBCs can communicate with each other based on the communication parameter. For example, the can send setting instructions of the communication parameter to the plurality of VOBCs, to set the communication parameters of each of the plurality of VOBCs.

In one embodiment, the gateway can turn off one or function modules that do not need to run, or enter an energy-saving mode based on the driving information and the driving environment information, to realize energy consumption minimized. The gateway can also control one or more function modules of the VOBC to be turned off, or control the VOBC to enter an energy-saving mode based on the driving information and the driving environment information, to realize energy consumption minimized.

For example, the gateway can generate energy-saving instructions based on the driving information and the driving environment information, and send the energy-saving instructions to the plurality of VOBCs. One ore more VOBCs can respond the energy-saving instructions to enter an energy-saving mode.

In one embodiment, the gateway can also respond the energy-saving instructions to enter an energy-saving mode.

In one embodiment, the plurality of VOBCs can send setting results of the communication parameter to the gateway after completing the setting of the communication parameter. The gateway can receive the setting results of the communication parameter returned by the plurality of VOBCs, and set the setting results of the communication parameter as comparison reference parameters of the plurality of VOBCs in a next parameter setting process, so as to avoid frequent setting of communication parameter.

In the above-mentioned communication control method, the gateway can provide different communication flow limits according to the driving information and the driving environment information of the vehicle, realizing an optimization of the energy efficiency of the vehicle, reducing the energy consumption of the vehicle, and improving the driving range of the vehicle.

Figure 7:
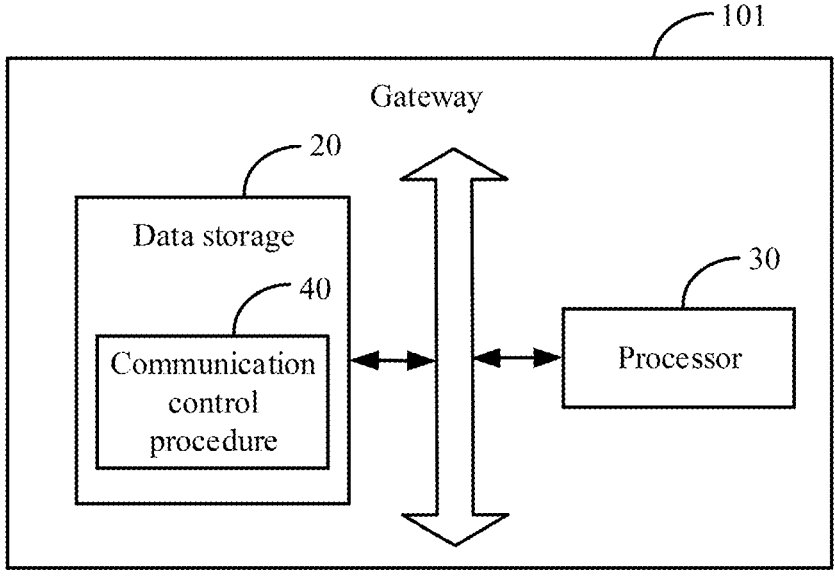
FIG. 7 is a structure diagram illustrating the gateway according to an embodiment of the present disclosure.

Referring to FIG. 7, the gateway 101 may include at least one data storage 20, at least one processor 30, and a communication control procedure 40.

In one embodiment, the data storage 20 can be set in the gateway 101, or can be a separate external memory card, such as an SM card (Smart Media Card), an SD card (Secure Digital Card), or the like. The data storage 20 can include various types of non-transitory computer-readable storage mediums. For example, the data storage 20 can be an internal storage system, such as a flash memory, a random access memory (RAM) for the temporary storage of information, and/or a read-only memory (ROM) for permanent storage of information. The data storage 20 can also be an external storage system, such as a hard disk, a storage card, or a data storage medium. The processor 30 can be a central processing unit (CPU), a microprocessor, or other data processor chip that achieves the required functions.

In one embodiment, the communication control procedure 40 may include one or more software programs in the form of computerized codes stored in the data storage 20. The computerized codes can include instructions that can be executed by the processor 30 to implement the above-mentioned of method, or function of modules (operation logic module 1011, communication decision module 1012, and communication regulation module 1013).

In other embodiments, comparing with FIG. 7, the gateway 101 can include more or less elements, for example, the gateway 101 can further include communication elements, buses elements.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A communication control method applied to a gateway of a vehicle, comprising:

obtaining driving information and driving environment information of the vehicle;

determining a communication parameter according to the driving information and the driving environment information of the vehicle;

sending the communication parameter to a plurality of vehicle on board controllers (VOBCs) of the vehicle, wherein the communication parameter is selected form a group of a communication frequency, a communication rate, and a communication protocol; and the plurality of VOBCs communicate with each other according to the communication parameter;

generating an energy-saving instruction according to the driving information and the driving environment information of the vehicle; and sending the energy-saving instruction to the plurality of VOBCs, wherein at least one of the plurality of VOBCs responds the energy-saving instruction to enter an energy-saving mode.

2. The method of claim 1, wherein determining the communication parameter according to the driving information and the driving environment information of the vehicle further comprises:

determining driving characteristics of the vehicle according to the driving information and the driving environment information of the vehicle; and determining the communication parameter according to the driving characteristics of the vehicle.

3. The method of claim 2, wherein determining the communication parameter according to the driving characteristics of the vehicle further comprises:

obtaining driving events of the vehicle; and determining the communication parameter according to the driving characteristics and the driving events of the vehicle.

4. The method of claim 2, wherein the communication parameter meets a communication requirement of the driving characteristics of the vehicle, and a communication energy consumption of the plurality of VOBCs based on the communication parameter meets a preset energy consumption requirement.

5. The method of claim 1, further comprising:

receiving setting results of the communication parameter returned by the plurality of VOBCs, and setting the setting results of the communication parameter as comparison reference parameters of the plurality of VOBCs in a next parameter setting process.

6. The method of claim 1, wherein both of the driving information and the driving environment information comprise one or more information features, and each information feature is provided with a parameter response weight, determining the communication parameter according to the driving information and the driving environment information of the vehicle further comprises:

determining the communication parameter according to eigenvalues of first information features comprised in the driving information, parameter response weights corresponding to the first information features, eigenvalues of second information features comprised in the driving environment information, and parameter response weights corresponding to the second information features.

7. A gateway applied to a vehicle, comprising:

at least one processor; and a data storage storing one or more programs which when executed by the at least one processor, cause the at least one processor to:

obtain driving information and driving environment information of the vehicle;

determine a communication parameter according to the driving information and the driving environment information of the vehicle;

send the communication parameter to a plurality of vehicle on board controllers (VOBCs) of the vehicle, wherein the communication parameter is selected form a group of a communication frequency, a communication rate, and a communication protocol; and the plurality of VOBCs communicate with each other according to the communication parameter;

generate an energy-saving instruction according to the driving information and the driving environment information of the vehicle; and send the energy-saving instruction to the plurality of VOBCs, wherein at least one of the plurality of VOBCs responds the energy-saving instruction to enter an energy-saving mode.

8. The gateway of claim 7, wherein when the at least one processor is caused to determine the communication parameter according to the driving information and the driving environment information of the vehicle, the least one processor is further caused to:

determine driving characteristics of the vehicle according to the driving information and the driving environment information of the vehicle; and determine the communication parameter according to the driving characteristics of the vehicle.

9. The gateway of claim 8, wherein when the at least one processor is caused to determine the communication parameter according to the driving characteristics of the vehicle, the least one processor is further caused to:

obtain driving events of the vehicle; and determine the communication parameter according to the driving characteristics and the driving events of the vehicle.

10. The gateway of claim 8, wherein the communication parameter meets a communication requirement of the driving characteristics of the vehicle, and a communication energy consumption of the plurality of VOBCs based on the communication parameter meets a preset energy consumption requirement.

11. The gateway of claim 7, wherein the least one processor is further caused to:

receive setting results of the communication parameter returned by the plurality of VOBCs, and set the setting results of the communication parameter as comparison reference parameters of the plurality of VOBCs in a next parameter setting process.

12. The gateway of claim 7, wherein both of the driving information and the driving environment information comprise one or more information features, and each information feature is provided with a parameter response weight, when the least one processor is caused to determine the communication parameter according to the driving information and the driving environment information of the vehicle, the least one processor is further caused to:

determine the communication parameter according to eigenvalues of first information features comprised in the driving information, parameter response weights corresponding to the first information features, eigenvalues of second information features comprised in the driving environment information, and parameter response weights corresponding to the second information features.

13. A vehicle comprising:

a gateway; and a plurality of vehicle on board controllers (VOBCs) communicated with the gateway, wherein the gateway is configured to obtain driving information and driving environment information of the vehicle, determine a communication parameter according to the driving information and the driving environment information of the vehicle, and send the communication parameter to the plurality of VOBCs, the communication parameter is selected form a group of a communication frequency, a communication rate, and a communication protocol, and the plurality of VOBCs communicate with each other according to the communication parameter, the gateway is further configured to generate an energy-saving instruction according to the driving information and the driving environment information of the vehicle, and send the energy-saving instruction to the plurality of VOBCs; and at least one of the plurality of VOBCs responds the energy-saving instruction to enter an energy-saving mode.

* * * * *